United States Patent
Burgard et al.

(10) Patent No.: US 7,232,966 B2
(45) Date of Patent: Jun. 19, 2007

(54) STEERING WHEEL HORN CONTACT UNIT AND ASSEMBLY

(75) Inventors: Jürgen Burgard, Hösbach (DE); Jupp Fleckenstein, Bessenbach (DE); Michael Fuchs, Westerngrund (DE); Bernd Stransfeld, Grossostheim (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/966,949

(22) Filed: Oct. 15, 2004

(65) Prior Publication Data

US 2005/0082151 A1 Apr. 21, 2005

(30) Foreign Application Priority Data

Oct. 15, 2003 (DE) .......................... 203 15 868 U

(51) Int. Cl.
*H01H 9/00* (2006.01)
(52) U.S. Cl. ................. 200/61.55; 200/61.54; 74/484 H
(58) Field of Classification Search .. 200/61.54–61.57; 280/728–731; 74/484 H, 552, 558
See application file for complete search history.

(56) References Cited

U.S. PATENT DOCUMENTS

| 5,303,952 | A |  | 4/1994 | Shermetarao et al. |
| 5,327,796 | A |  | 7/1994 | Ernst et al. |
| 5,331,124 | A | * | 7/1994 | Danielson ................. 200/61.54 |
| 5,593,178 | A |  | 1/1997 | Shiga et al. |
| 5,738,369 | A | * | 4/1998 | Durrani ....................... 280/731 |
| 5,950,494 | A | * | 9/1999 | Sugiyama ................. 200/61.55 |
| 6,062,592 | A | * | 5/2000 | Sakurai et al. ........... 280/728.2 |
| 6,719,324 | B2 | * | 4/2004 | Albers et al. ............. 200/61.55 |
| 6,722,227 | B2 | * | 4/2004 | Rabagliano et al. ..... 200/61.54 |

FOREIGN PATENT DOCUMENTS

| DE | 2352257 | 4/1975 |
| EP | 0704367 | 8/1998 |
| EP | 0827878 | 10/2001 |
| JP | 8230682 | 9/1996 |
| JP | 9030425 | 2/1997 |
| WO | 2004026639 | 4/2004 |

* cited by examiner

*Primary Examiner*—Elvin Enad
*Assistant Examiner*—M. Fishman
(74) *Attorney, Agent, or Firm*—Tarolli, Sundheim Covell & Tummino LLP

(57) ABSTRACT

A steering wheel horn contact unit has a metal contact sheet (40). The metal contact sheet (40) is embedded into a carrier part (52) of plastic and mounted therein and has at least one freely projecting horn contact tongue (46). Viewed in switching movement direction (X), the horn contact tongue (46) is surrounded by the carrier part (52).

12 Claims, 2 Drawing Sheets

STEERING WHEEL HORN CONTACT UNIT AND ASSEMBLY

TECHNICAL FIELD

The invention relates to a steering wheel horn contact unit, i.e. a part of the switching circuit, integrated in the vehicle steering wheel, for the actuation of the horn. The invention further relates to an assembly with a steering wheel horn contact unit.

BACKGROUND OF THE INVENTION

The invention relates in particular to a horn contact unit for a so-called floating horn module, i.e. a gas bag module which is displaceably mounted in axial direction of the steering wheel, in order to close the circuit for the horn at the end of the displacement path. On the rear side of the gas bag module, therefore usually either on the module itself or on an intermediate metal sheet between the module and the steering wheel skeleton, at least one horn contact unit is arranged.

BRIEF SUMMARY OF THE INVENTION

It is an object of the invention to provide a steering wheel horn contact unit which is secure with regard to transport, which nevertheless makes possible a so-called soft closing of the horn contacts.

The steering wheel horn contact unit according to the invention has for this purpose a metal contact sheet, which is embedded into a carrier part of plastic and mounted therein and has at least one freely projecting horn contact tongue. Viewed in switching movement direction, the horn contact tongue is surrounded by the carrier part.

The freely projecting horn contact tongue is the part of the metal contact sheet which comes in contact with the cooperating contact for horn actuation. By this part of the metal contact sheet being constructed as a freely projecting tongue, it becomes elastically yielding like a plate spring, when the cooperating contact presses on the horn contact tongue. This makes possible a soft switching. The carrier part surrounds the horn contact tongue laterally and protects it from bending during transportation or during installation, so that the moment of contact established by the position of the horn contact tongue during its manufacture, and the contact spacing, can be precisely maintained. Preferably, the horn contact tongue is angled obliquely with respect to the rest of the metal contact sheet, which usually lies in a plane perpendicular to the switching movement direction (direction of movement of the module on actuation of the horn). This is intended to provide a particularly soft switching.

A further improvement to security on transportation can be achieved if the carrier part, at least with the section by which the carrier part surrounds the horn contact tongue, projects with respect to the latter in the switching movement direction and in an opposite direction. In the installed state and in a cross-section in the steering wheel axis, this means that the carrier part projects upward and downward with respect to the horn contact tongue and surrounds it like a protective ring.

The best protection can of course be achieved if the section of the carrier part surrounding the horn contact tongue is a peripherally closed ring.

To increase the security against bending of the metal contact sheet also in other sections, the carrier part completely surrounds the metal contact sheet, viewed in the switching movement direction. This also increases the stability of the horn contact unit.

The carrier part can also fulfill additional functions, by for example having at least one formed-on mounting for a restoring spring. This restoring spring serves to restore the module after its displacement for actuation of the horn.

A secure connection between carrier part and metal contact sheet is ensured if the carrier part is produced by injecting around the metal contact sheet.

Of course, the contact sheet can also have several horn contact tongues. These are respectively surrounded by an associated section of the carrier part, as previously mentioned.

The invention also relates to an assembly with an intermediate plate for a gas bag module, on which the gas bag module is either securely or movably arranged, and with a steering wheel horn contact unit according to the invention. Detent noses, which ensure an easy connection between the intermediate plate and the horn contact unit, are formed on the carrier part for engagement on the intermediate plate.

DETAILED DESCRIPTION OF A PREFERRED EMBODIMENT

Figure 1:
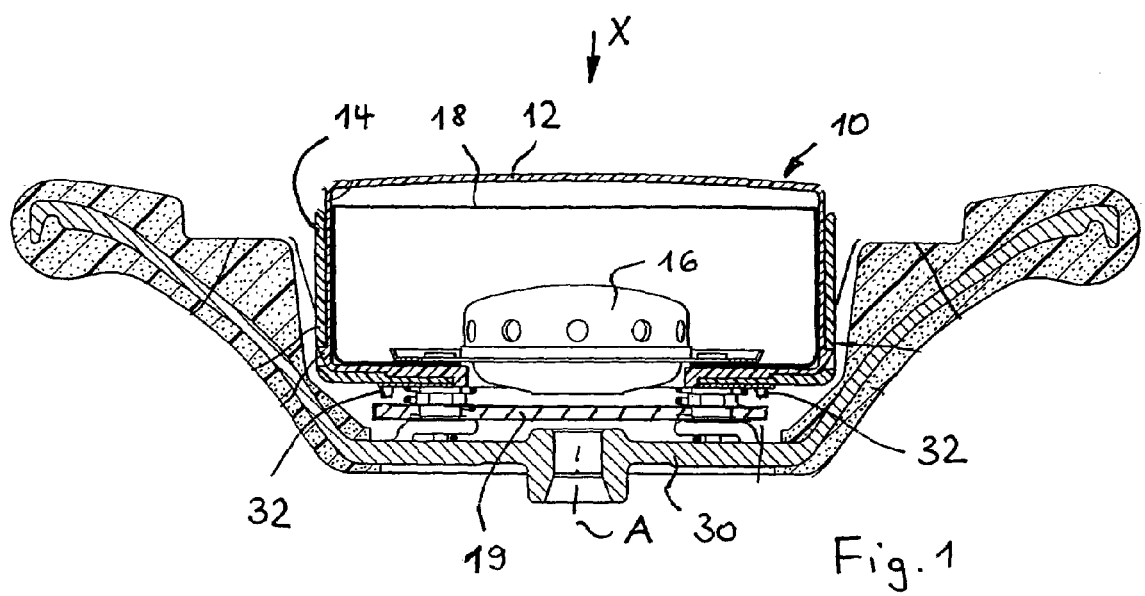
FIG. 1 shows a cross-sectional view through a steering wheel with an assembly according to the invention and with a steering wheel horn contact unit according to the invention.

In FIG. 1 a vehicle steering wheel is illustrated with a gas bag module 10. The gas bag module 10 has an outer housing which is formed by a covering 12 on the front side and by a cup-shaped generator carrier 14. In the gas bag module 10 are, inter alia, a gas generator 16 and a gas bag 18. On the rear side, the gas generator carrier 14 is connected with an assembly 19, which has an intermediate plate 20 (see FIG. 2). The assembly 19 comprises the largely flat intermediate plate 20 of sheet metal and two elongated steering wheel horn contact units 22 on the side edges of the intermediate plate.

By means of restoring springs 28, which are fastened on the assembly 19, the gas bag module 10 sits, in axial direction, in relation to the steering wheel axis A, displaceably on the intermediate plate, which in turn is securely connected with the steering wheel skeleton 30.

The gas bag module is a so-called floating-horn module, which can be displaced by pressing in switching movement direction X, until a horn switching circuit is closed, in order to actuate the horn. On the underside of the generator carrier 14, several projecting contacts 32 are arranged for this. On the assembly, for each contact 32 there is a cooperating contact on the steering wheel horn contact units 22.

Figure 3:
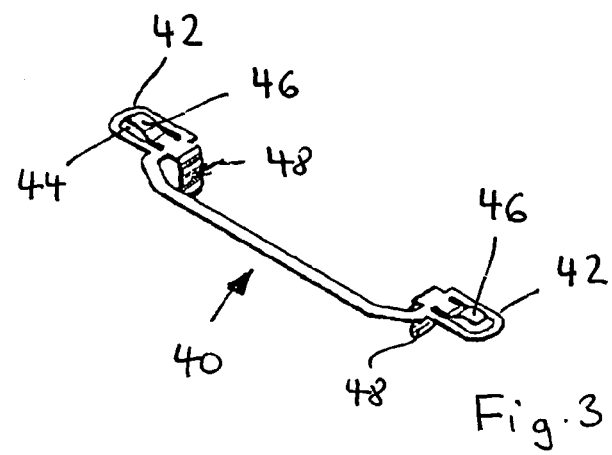
FIG. 2 shows a top view onto the assembly according to the invention and the steering wheel horn contact unit according to the invention and FIG. 3 shows a perspective view of the metal contact sheet, provided in the steering wheel horn contact unit according to the invention, before the injection molding.

The steering wheel horn contact units 22 respectively comprise a punched metal contact sheet 40, shown in FIG. 3, which has at its opposite ends two lugs 42, in the interior of which, through a U-shaped punched-out section 44, respectively a freely projecting horn contact tongue 46 is produced. The horn contact tongues 46 are constructed so as to be elastic and act like a plate spring. In addition, they are angled obliquely toward the top with respect to the rest of the otherwise flat metal contact sheet 40. In the region of the projections of the horn contact tongues 46, downwardly angled connection lugs 48 are provided on the metal contact sheet 40, onto which connections of electrical leads are placed as part of the horn switching circuit.

Figure 2:
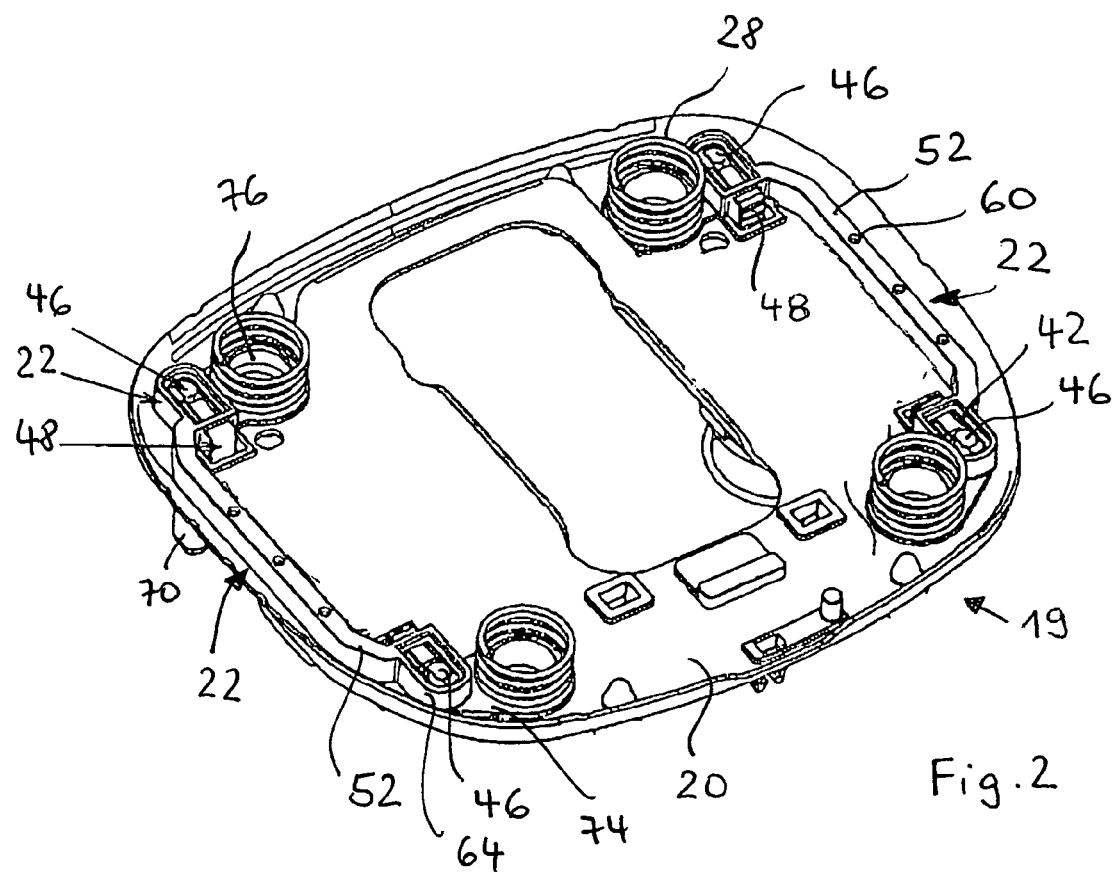

To provide the steering wheel horn contact unit, each metal contact sheet 40 is injected around with plastic, so that a carrier part 52 of plastic is produced which, viewed in switching movement direction X, i.e. as in FIG. 2 from above, completely surrounds the metal contact sheet 40 on the edge side and also largely covers it from top to bottom. Small openings 60, which run through the carrier part 52 up to the metal contact sheet 40, are produced during the injection molding through positioning pins for the metal contact sheet 40. Except for the inner edge of the lugs 42, the switching horn contact tongues 46 and the lugs 48, the metal contact sheet is completely embedded in the carrier part 52. The section 64 of each carrier part 52, which is arranged around the horn contact tongue 46, forms a peripherally closed frame around the respective horn contact tongue 46, so that the horn contact tongues 46 are protected laterally from the action of force, which would lead to their bending. Also the height of the section 64 (measured in direction X) is selected so that the section 64 projects upwards and downwards with respect to the associated horn contact tongue 46. Thereby, the horn contact tongue 46 is also to be protected against inadvertent bending by the action of force from above or below. The section 64 surrounds the associated horn contact tongue 46 like a protective frame.

To simplify the fastening of the steering wheel horn contact units 22 on the carrier plate, detent noses 70 are formed on the carrier part 52, which after insertion into corresponding openings provide for a locking of the steering wheel horn contact units 22 on the intermediate plate 20.

In the vicinity of the sections 64, in addition on each carrier part 52, protrusions 74 are formed, which have a ring-shaped elevation 76. The springs 28 are simply placed from above onto the elevations 76, which act as bearings, in order to engage on the carrier part 52.

On pressing the gas bag module 10 in the switching movement direction X, the springs 28 are compressed until the contacts 32 press softly against the horn contact tongues 46, in order to close the horn switching circuit.

The invention claimed is:

1. A steering wheel horn contact unit, comprising:
   a metal contact sheet (40),
   said metal contact sheet (40) being embedded into a carrier part (52) of plastic and mounted therein, and having at least one freely projecting horn contact tongue (46), said horn contact tongue (46) being bendable,
   said horn contact tongue (46) being surrounded by said carrier part (52), viewed in switching movement direction (X), and
   wherein a height of said carrier part (52), at least in a section (64) surrounding said horn contact tongue (46) is such that the section (64) projects upwards and downwards with respect to said horn contact tongue (46), in said switching movement direction (X) so that the contact tongue (46) does not protrude over the section (64).

2. The steering wheel horn contact unit according to claim 1, wherein said horn contact tongue (46) is angled obliquely with respect to a rest of said metal contact sheet (40).

3. The steering wheel horn contact unit according to claim 1, wherein said carrier part (52), viewed in switching movement direction (X), completely surrounds said metal contact sheet (40).

4. The steering wheel horn contact unit according to claim 1, wherein said section (64) of said carrier part (52) surrounding said horn contact tongue (46), is a peripherally closed ring.

5. The steering wheel horn contact unit according to claim 1, wherein said carrier part (52) has at least one formed-on bearing for a restoring spring (28).

6. The steering wheel horn contact unit according to claim 1, wherein said carrier part (52) is produced by injection molding around said metal contact sheet (40).

7. The steering wheel horn contact unit according to claim 1, wherein said metal contact sheet (40) has several horn contact tongues (46), which are respectively surrounded by an associated section (64) of said carrier part (52).

8. An assembly, with an intermediate plate (20) for a gas bag module (10), on which said gas bag module (10) is fastened, and with at least one steering wheel horn contact unit (22) according to claim 1.

9. The assembly according to claim 8, wherein at least one detent nose (70) is formed on said carrier part (52) for engagement on said intermediate plate (20).

10. The steering wheel contact unit according to claim 1, wherein said contact sheet has at least one lug, said contact tongue being provided in the interior of said lug, and said lug being embedded in said carrier part.

11. A gas bag module comprising:
    a generator carrier (14) carrying at least one projecting electrical contact (32) and
    a steering wheel horn contact unit, comprising
    a metal contact sheet (40),
    said metal contact sheet (40) being embedded into a carrier part (52) of plastic and mounted therein, and having at least one freely projecting horn contact tongue (46), and
    said horn contact tongue (46) being surrounded by said carrier part (52), viewed in switching movement direction (X), and the at least one projecting electrical contact (32) being a complementary contact for the at least one freely projecting horn contact tongue (46),
    wherein a height of said carrier part (52), at least in a section (64) surrounding said horn contact tongue (46), is such that the section (64) projects upwards and downwards with respect to said horn contact tongue (46), in said switching movement direction (X) so that the contact tongue (46) does not protrude over the section (64).

12. The gas bag module according to claim 11, wherein said projecting electrical contact (32) protrudes into a space circumscribed by said carrier part (52) to directly contact said tongue (46).

* * * * *